United States Patent
Hohn

[15] 3,667,290
[45] June 6, 1972

[54] METHOD AND APPARATUS FOR ESTIMATING THE FORCE GENERATED BY A MOTOR AS A FUNCTION OF AN EXTERNAL LOAD IMPOSED THEREON

[72] Inventor: Richard E. Hohn, Cincinnati, Ohio
[73] Assignee: Cincinnati Milacron Inc., Cincinnati, Ohio
[22] Filed: Aug. 6, 1970
[21] Appl. No.: 61,702

[52] U.S. Cl. ................................73/133, 73/136 R, 73/116
[51] Int. Cl. .........................................................G01l 3/00
[58] Field of Search..............73/112, 115, 116, 117.2, 117.3, 73/133, 136

[56] References Cited

UNITED STATES PATENTS

| | | | |
|---|---|---|---|
| 3,175,394 | 3/1965 | Novas | 73/136 R |
| 3,019,640 | 2/1962 | Engelmann | 73/136 R |

*Primary Examiner*—Charles A. Ruehl
*Attorney*—Howard T. Keiser and Alfred J. Mangels

[57] ABSTRACT

A method and apparatus for estimating the force produced by a motor as a result of an external load imposed thereon. An apparatus is provided for measuring the total force produced by the motor and producing a first input signal as a function thereof. A transfer function circuit responsive to the input signal operates to subtract from said total force the dynamic and frictional forces in said motor. This result is integrated to produce an estimated motor velocity. A second input signal to the transfer function circuit is provided by an apparatus for measuring the actual velocity of the motor. The actual velocity is compared with the estimated velocity to produce a signal which is input to a feedback loop. The feedback loop provides a feedback signal which simultaneously is algebraically summed with the first input signal and produced by the transfer function circuit as a representation or estimation of an external load imposed on the motor.

9 Claims, 7 Drawing Figures

3,667,290

1

METHOD AND APPARATUS FOR ESTIMATING THE FORCE GENERATED BY A MOTOR AS A FUNCTION OF AN EXTERNAL LOAD IMPOSED THEREON

BACKGROUND OF THE INVENTION

This invention concerns the determination of a force produced by a motor as a result of an external load. There are many applications where such a measurement is necessary. For example, in certain machine tool applications it may be necessary to measure the axial thrust produced on a machine slide by the cutting forces. Specifically, in a drilling application, to fully control this process, the axial thrust produced by the feed axis on the drill may be monitored and controlled. It should be noted at this time that the axis may be controlled by a linear or rotary actuator such as a hydraulic piston and cylinder or a rotary electric or hydraulic motor, respectively. Both motors produce a force; however, the rotary motors produce a force at a radius to generate a torque. Whenever, the term force is used in this specification or the appended claims, it is meant to include forces generated lineraly and forces generated at a radius.

In other machine tool applications, in order to adequately monitor the cutting process and make feed and speed changes accordingly, it is necessary to monitor the cutting forces imposed on the spindle. In this as in the other applications, this measurement must be reasonably accurate and must occur over a relatively wide range of values. Typically, in milling machine applications, cutter sizes may vary from 6 inches in diameter down to one-half an inch or less. There have been two traditional approaches to obtain a measurement of load or cutting force on the spindle. One approach has been to place a torque transducer on the spindle as close to the cutter as possible. There are many disadvantages encountered in this approach. First, a transducer of sufficient accuracy and range is an extremely expensive component. Second, the transducer must typically be mounted in the spindle shaft which may introduce a significant structural weakness; and third because the spindle is a rotating body, it is difficult to obtain an output signal from the transducer.

Another method of obtaining a measurement of motor force is to look at the system externally. In other words, one must measure the external parameters of the motor such as its input and output characteristics and then compute the total force generated therein. Again, there are several inherent problems in this approach; the most significant being that this measurement ignores the inherent dynamic and frictional forces within the motor and power transmission means to the load. In the case of a hydraulic motor, these losses will be significant. It requires a substantial input to the hydraulic motor just to rotate it and a power transmission with no external load. These forces may be equal to or exceed the actual cutting forces when using a small diameter cutter. In the case of the electric motors, the losses in the motor itself are less; but the losses in the power transmission are still present. Therefore, the above system does not provide the most accurate indication of motor force as a result of a load thereon.

Applicant discloses an improved method and apparatus for detecting forces generated by a motor as a result of an external load exclusive of dynamic and frictional forces in the motor and power transmission. One further distinction between applicant's invention and the prior art should be noted. The disclosed system does not detect the actual input parameters to the motor. For example, in an electric motor, the input parameter would be the applied voltage. In a hydraulic motor, the input parameter is the applied voltage to a servo valve which controls the flow rate of hydraulic fluid to the motor. The proposed system detects a parameter that more directly reflects a change in the total force generated by the motor. In an electric motor, the parameter to be detected is armature current; and in a hydraulic motor, the parameter is the pressure drop across the motor.

SUMMARY OF THE INVENTION

Applicant claims a method and apparatus for determining a force produced by a motor as a function of an external load imposed thereon exclusive of dynamic and frictional forces in said motor. The invention is comprised of a first apparatus for deriving a first input signal proportional to a total force produced by said motor. Next, a transfer function circuit produces correction signals representing values of dynamic and frictional forces in said motor. An estimated velocity signal is produced within the transfer function circuit by algebraically summing the first input signal and the correction signals and integrating the sum. The result of the integration is summed in a network with a second input from a velocity transducer coupled to the motor. An output from the network is amplified in a feedback loop to produce a feedback signal. The feedback signal is algebraically summed with the first input; and further, the feedback signal is an output from the transfer function circuit representing the external load applied to the motor.

DESCRIPTION OF THE PREFERRED EMBODIMENT

Figure 1:
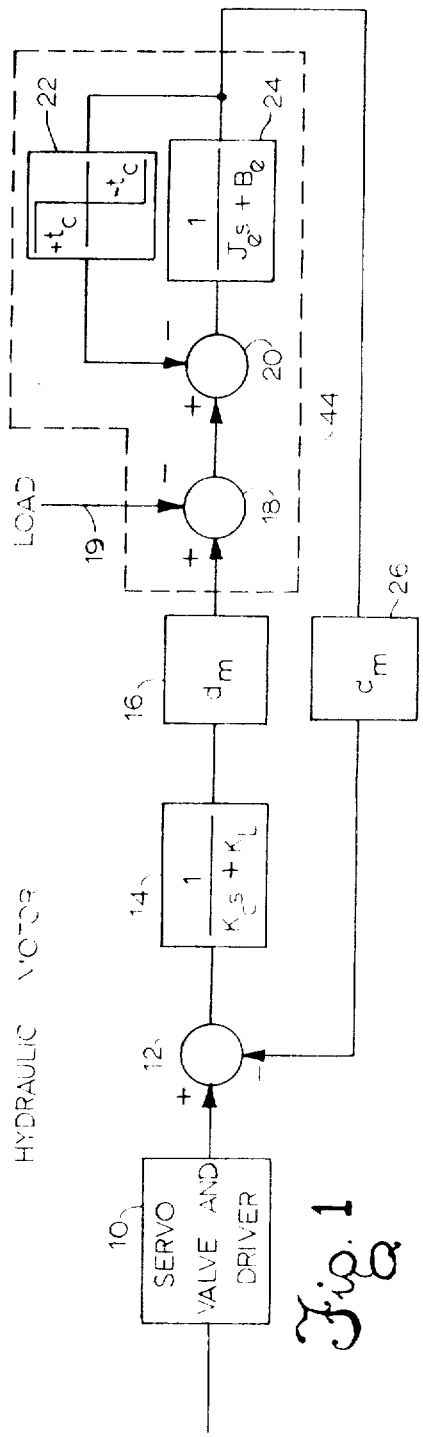
FIG. 1 is a mathematical block diagram of a hydraulic motor.

FIG. 1 is a mathematical block diagram of a hydraulic motor. A voltage signal is applied to the input of the servo-valve and valve drive 10. The valve drive 10 is merely an amplifier that is responsive to the input voltage signal for producing an output current to drive the servo-valve. Typically, the servo-valve is an electro-magnetic device which is responsive to the driver output for generating a valving action and porting a flow rate of fluid proportional to the driver output. The output of the valve passes through a summing junction 12 and into a transfer function 14 defined by $1/(K_c s + K_L)$. The coefficient of the Laplacian operator represents the compressibility coefficient of the liquid contained in the motor-valve combination, and the other constant represents the leadage factor through the motor-valve combination. After an integration and modification by the transfer function 14, an output is produced that represents a pressure drop across the motor. This output is an input to a transfer function 16 which modifies its input as a function of the displacement of the motor to produce an output representing the total motor force developed. The total motor force developed is summed in a summing junction 18 with an external load 19 which is applied on the motor. An output of the summing junction 18 is summed in a summing junction 20 with an output generated by a transfer function 22 which represents a force produced by the coulomb friction of the motor. A output sum from the summing junction 20 is an input to a transfer function 24 defined by $1/(J_e s + B_e)$ which performs another integration and produces an output representing motor velocity. The coefficient of the Laplacian operator represents the effective inertia of the motor; and the other constant represents the effective viscous friction of the motor. By modifying the output of transfer function 24 by a proportionality constant representing the displacement of the motor, a transfer function 26 produces an output as a function of flow rate which is fed back to the summing junction 12. FIG. 1 is only a general description of the transfer function definitions of a hydraulic motor. However, it should be sufficient for those who are skilled in the art of servo-mechanism control design and is only being used to help distinguish the disclosed invention from the prior art devices.

Figure 2:
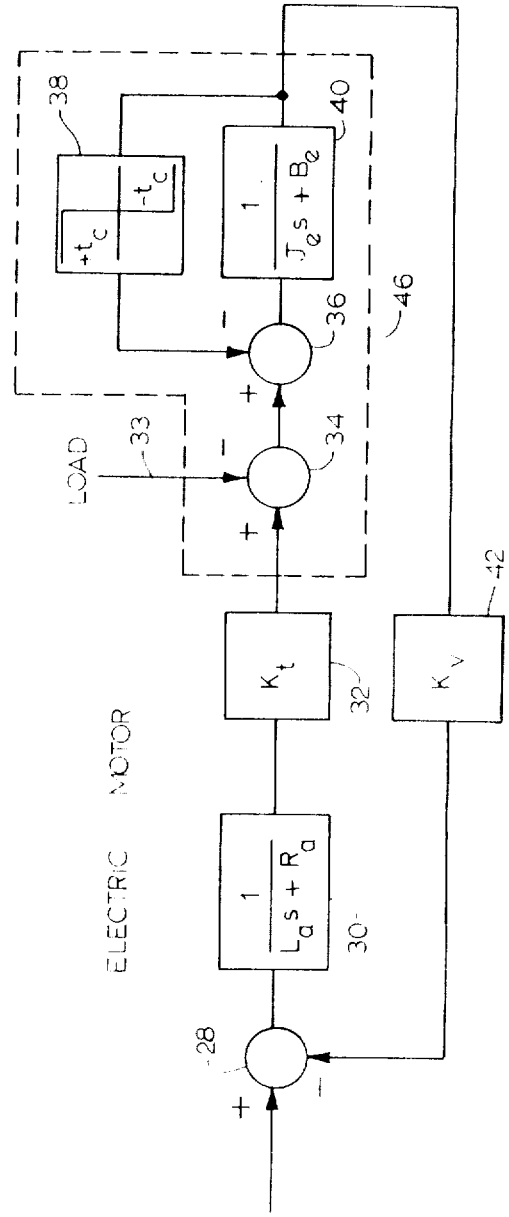
FIG. 2 is a mathematical block diagram of a direct current electric motor.

FIG. 2 is a mathematical block diagram representing a DC electric motor. An input voltage is applied through a summing junction 28 to an output of a transfer function 30 defined by $1/(L_a s + R_a)$. The coefficient of the Laplacian operator represents the motor armature circuit inductance; and the other constant represents motor armature circuit resistance. An output of the transfer function 30 represents armature current. This output is modified by a transfer function 32 which represents the torque constant of the motor. An output from the transfer function 32 represents torque generated by the motor and is summed with an imposed external load 33 in a summing junction 34. An output sum therefrom is an input to a summing junction 36 having another input from a feedback loop transfer function 38 defining coulomb friction losses. An output from the summing junction 36 is input to a transfer function 40 defined by $1/(J_e s + B_e)$ and producing an output representing motor velocity. The output from transfer function 40 is fed back through a transfer function 42 having a proportionality constant equal to the velocity constant of the motor; and an output voltage is produced which is summed in the summing junction 28 with the input voltage.

It should be noted in comparing FIGS. 1 and 2 that functionally the elements enclosed within the dashed line blocks 44 and 46 are identical. The relationship between the dynamic and frictional forces in the motor to the external load is identical in both cases. If one wanted to measure the force produced on the motor by an external load, it would be most desirable to use a torque transducer mounted as close as possible to the point at which the load is applied. The disadvantages of this method have already been discussed. Another method, which constitutes applicant's basic approach, is to indirectly estimate the external force on the motor. This is accomplished by measuring parameters within the motor representing the total force generated and the actual velocity. These parameters are input to a transfer function circuit defining the dynamic and frictional characteristics of said motor. Said transfer function circuit produces an output signal representing the estimated external force on the motor. It is impractical to directly measure the inputs to blocks 44 and 46 which represent the total force generated. However, the inputs of transfer functions 16 and 32 are readily available and admissible to measurement. Therefore, the blocks 16 and 44 of FIG. 1 and blocks 32 and 46 of FIG. 2 represent practical points where inputs and outputs may be monitored. In FIG. 1, the input to block 16 is a pressure drop across the motor; and in FIG. 2, the input to block 32 is armature current. The outputs of the blocks 44 and 46 are motor velocity.

Figure 3:
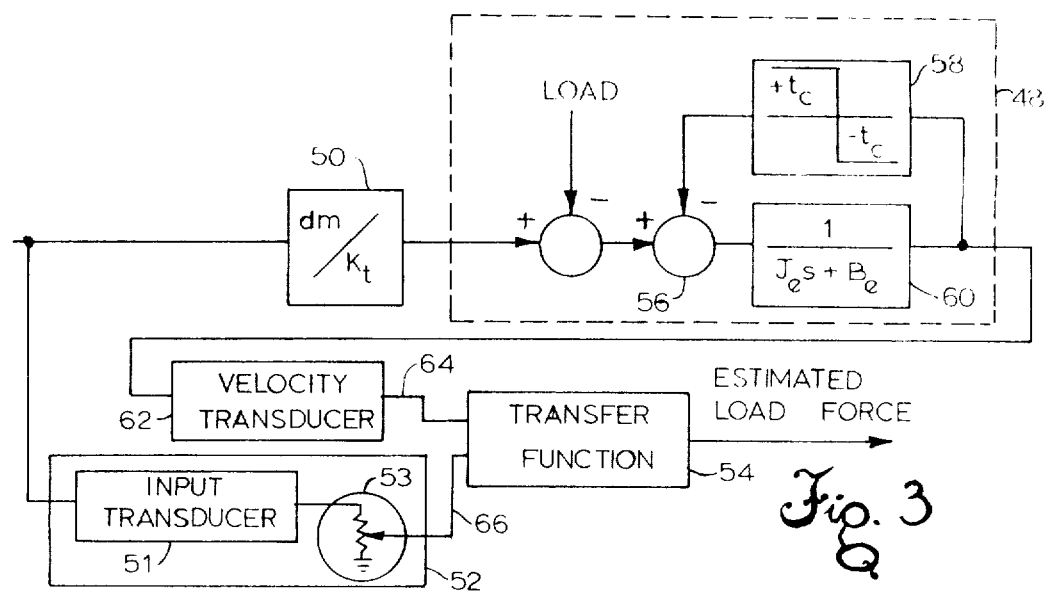
FIG. 3 is a general block diagram showing the relationship of the invention to any motor configuration.

FIG. 3 illustrates generally the proposed invention. The dashed line block 48 corresponds to the blocks 44 and 46 of FIGS. 1 and 2 respectively. Further blocks 48 and 50 represent a portion of a motor having an external load which the disclosed apparatus will accurately estimate. A transducer 52 is connected to an input of block 50 which defines a proportionality constant representing either a motor displacement or a torque constant. The transducer 52 is comprised of two elements which are in input transducer 51 and a potentiometer 53. The input transducer 51 may be a differential pressure device which is responsive to the pressure drop across the motor; or it may be a series armature resistor which will provide a measure of armature current. As mentioned earlier, the input of block 50 is a signal proportional to total force generated by the motor. Block 50 defines a proportionality constant that operates dimensionally on its input to produce an output that, in fact, represents the total force generated by the motor. This proportionality constant is represented by the potentiometer 53 in the transducer 52. Therefore, the transducer 52 produces an output signal on line 66 which represents the total force generated by the motor. A transfer function circuit 54 which is connected to the transducer 52 contains electrical networks that are analgous to the elements of within the block 48. The transfer function 54 modifies the output signal from the transducer 52 as a function of the dynamic and frictional forces as defined by elements 56, 58 and 60 to produce an estimated motor velocity signal. The transfer function 54 has a second input on line 64 which is provided by a velocity transducer 62 connected to the motor output. The velocity transducer 62 produces an actual motor velocity signal which is combined in the transfer function circuit 54 with the estimated motor velocity signal to produce an output signal therefrom proportional to the magnitude of an external load on the motor.

Referring back to FIGS. 1 and 2, it is apparent that if the actual inputs or applied voltages to the motors are used to monitor the load force imposed on the motors, the composition of the analgous transfer functions would be substantially more complicated and would vary substantially from one type of motor to another. Therefore, it is significant that the disclose invention does not monitor the motor inputs but monitors an internal parameter that more directly reflects the total force produced by the motor.

Figure 4:
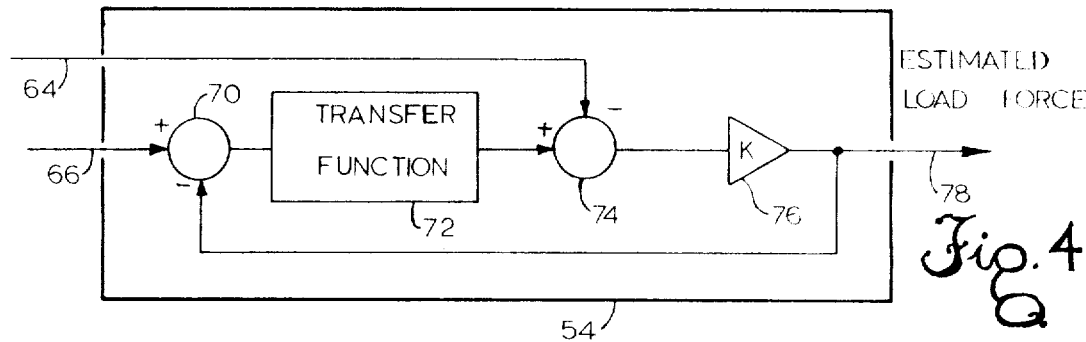
FIG. 4 is a general control system diagram of the disclosed invention.

FIG. 4 is a control system diagram illustrating generally the composition of the transfer function circuit 54. The output from the transducer 52 on line 66 is connected to a summing junction 70 which has an output connected to a transfer function circuit 72. The transfer function circuit 72 modifies its input according to predetermined values of dynamic and frictional forces and integrates the modified signal to produce an estimated motor velocity signal. The estimated motor velocity signal is compared in a summing junction 74 to the actual motor velocity signal on the line 64. An output signal from the summing junction 74 passes through a multiplier 76; is fed back to the summing junction 70 and is an output from the transfer function circuit 54. Since the signal on the input line 66 of the transfer function circuit 54 represents a total force generated by the motor, and the output signal from transfer function circuit 72 represents an estimated motor velocity considering the dynamic and frictional forces, the difference between the estimated velocity and the actual velocity from the summing junction 74 must be caused by an imposition of an external load on the motor. Therefore, the output of summing junction 74 is a signal proportional to the force generated by the motor as a result of an external load being applied thereon. This signal is amplified in multiplier 76 to produce an output signal on line 78 representing estimated load force on the motor.

It should be noted at this point that the output signal from transfer function circuit 72 is an estimate of motor velocity. One reason for this is that the predetermined values of the dynamic and frictional forces are not the absolute representation of these parameters in the actual motor. Even though the values may be very accurate assessments, at best, they are still approximations; and the velocity representation is only an estimate. Therefore, the output 78 of the multiplier 76 is not an absolute measure of load force but must be considered an estimate of load force. The process for determining the values of dynamic and frictional losses will be described in detail later.

Figure 5:
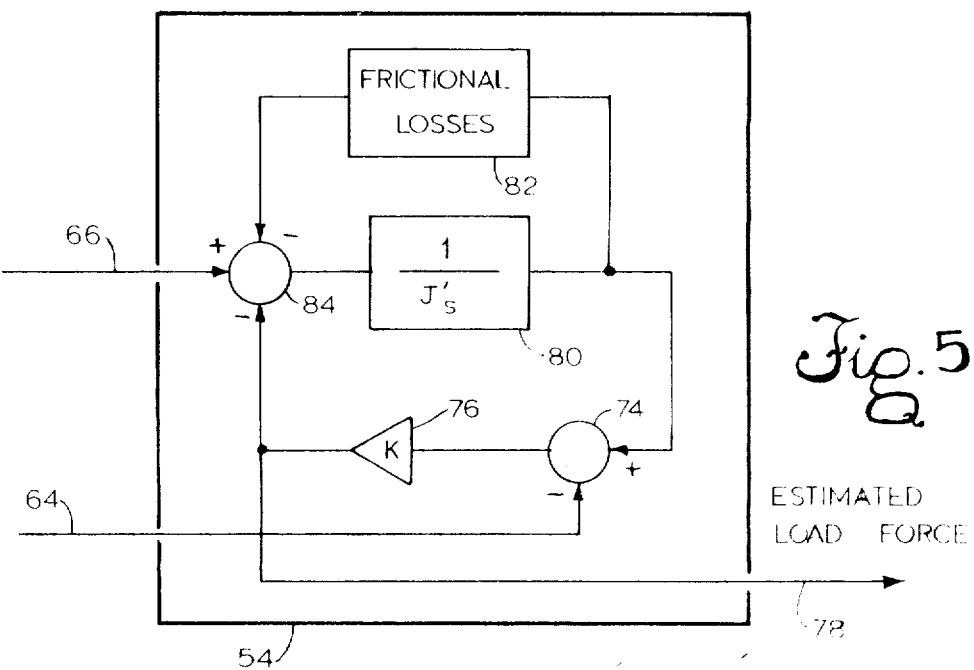
FIG. 5 is a general control system diagram showing an alternative arrangement of the invention.

FIG. 5 illustrates the control system diagram of FIG. 4 in more detail and in a slightly different configuration. The transfer function circuit 72 of FIG. 4 is replaced by transfer function circuits 80 and 82. The transfer function circuit 82 contains electrical networks analogous the frictional losses and is input to the summing junction 84 to modify the total motor force by an amount proportional to said losses. The transfer function circuit 80 contains electrical networks analogous to the system inertia for modifying the input in a manner inversely proportional to the predetermined value of inertia. Further, circuitry is provided for integrating the modified signal to produce an estimated motor velocity signal on the output of transfer function circuit 80. In FIG. 5, the summing junction 74 and multiplier 76 are connected as a feedback loop around the transfer function circuit 80. This illustrates that the system may be defined by many equivalent configurations of elements in control system diagrams.

Figure 6:
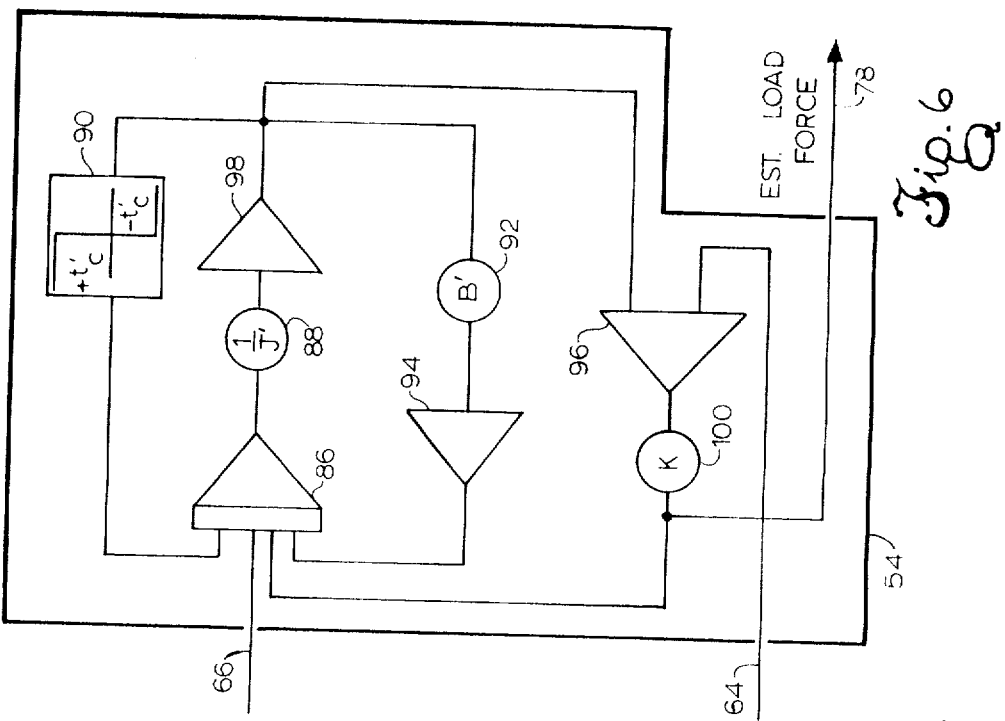
FIG. 6 is a detailed control system diagram of the disclosed invention.

FIG. 6 is a detailed control diagram of the transfer function circuit 54. As will be appreciated by those who are skilled in the art, the system is comprised of inverting devices; however non-inverting devices are readily applicable. In the disclosed system of inverting amplifier, the output of each amplifier is of an opposite polarity from its input. The input representing total motor force on the line 66 is connected to an integrator 86. Another input to the integrator 86 is from a feedback loop containing a switch 90. This switch 90 produces an output signal representative of a predetermined value of coulomb friction. When the input of the switch 90 is zero, indicating a zero estimated velocity, the switch output is zero. When the switch input is positive, indicating a rotation in one direction, the switch output assumes a value representing a predetermined magnitude of coulomb friction in that direction. When the switch input is negative, indicating rotation in the opposite direction, the switch output assumes a value representing a predetermined magnitude of coulomb friction in said opposite direction. Another input to the integrator 86 is from a second feedback loop comprising a potentiometer 92 and amplifier 94. The potentiometer 92 is adjustable to pass a signal representing a predetermined magnitude of viscous friction. This signal passes through amplifier 94 to the integrator 86. The final input to integrator 86 is from a third feedback loop comprising an amplifier 96 and a potentiometer 100. The amplifier 96 sums and amplifies a signal representing the estimated velocity with a signal defining the actual velocity on the line 64. A summation signal is an input to the potentiometer 100 which provides an appropriate loop gain. The output of potentiometer 100 is input to the integrator 86 and is produced from the transfer function circuit 54 on the line 78 represents an estimated load force signal. The integrator 86 algebraically sums all of the inputs and integrates the resultant sum. The result of the integration is input to potentiometer 88 which is set to a value representing a predetermined magnitude of the inverse of the motor inertia. The potentiometer connected is to amplifier 98 which as mentioned earlier, functions as an inverter.

Figure 7:
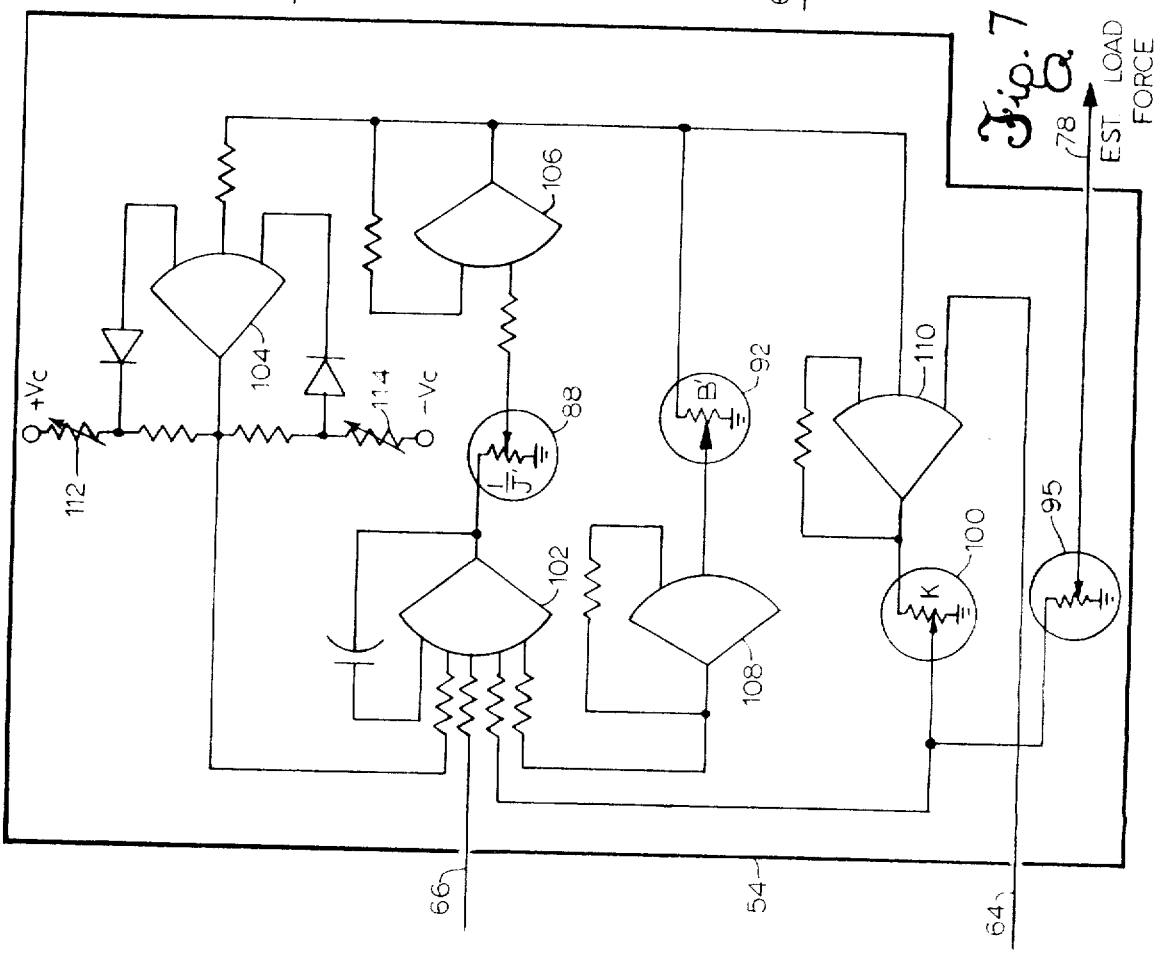
FIG. 7 is a detailed schematic diagram of one embodiment of the invention including apparatus necessary when using a power transmission means providing a mechanical advantage.

In the discussion up to this point, the external load was supplied directly to the motor. However in many applications, the load is applied to the motor through a power transmission means of some type, such as a gear box, a ball screw, etc. FIG. 7 is a detailed schematic diagram of the transfer function circuit 54 as applied to the above application. It should be noted that the only distinction from the previous embodiments is the addition of a potentiometer 95 representing the mechanical advantage of the power transmission means. In FIG. 7, the potentiometers 88, 92 and 100 are shown in more detail; however, the potentiometers 88 and 92 must be set to represent predetermined magnitudes of inertia and viscous friction respectively, of both the motor and power transmission means. The switch 90 of FIG. 6 is represented by the operational amplifier 104 in FIG. 7 which produces an output signal that follows the polarity of the amplifier signal. The output signal is biased to provide the proper positive or negative signal representing the values of coulomb friction for both directions of rotation of the motor and power transmission means. Further, the amplifiers 98 and 94 of FIG. 6 are implemented by operational amplifiers 106 and 108 in FIG. 7; said amplifiers have a resistive feedback to determine the gain range of the amplifier. The amplifier 96 of FIG. 6 is represented by operational amplifier 110 in FIG. 7. The integrator 86 of FIG. 6 is comprised of operational amplifier 102 in FIG. 7 which has a capacitive element in a feedback loop. FIG. 7 is applicable with the velocity transducer applied to the motor output as it has been in all earlier illustrations, and the only new element is the potentiometer 95 which represents the mechanical advantage of the power transmission means. Hence, the output signal on line 78 is a true estimation of an applied external load. Other embodiments of this application are possible. For example, the velocity transducer may be placed on the output of the power transmission means. In this case, the potentiometer 95 would be located in another position in the circuit. The possibility of many variations of this application, as with the whole configuration of transfer function 54 can be readily appreciated by those who are skilled in the art. There has been sufficient previous discussion as to the function and operation of transfer function circuit 54; and, therefore, further discussion as to its operation as shown by the circuit of FIG. 7 should be unnecessary.

However, one question remains unanswered, that being the determination of the predetermined values of inertia, coulomb friction, and viscous friction. These values may be determined theoretically and input on the respective potentiometers. However, they may also be determined by using the circuit of FIG. 7 to very accurately match the motor and power transmission means to which the control system is applied. This may be done by activating the system and placing a read-out device such as an oscilloscope on the line 78. Since the output signal on the line 78 represents the estimated load force, when the system is running without any load, the output signal should be zero. If it is not, then the predetermined frictional values are in error. To correct the value of viscous friction, an arbitrary motor speed is chosen; and the value of estimated load force is recorded. The motor is then changed to another speed. If the estimated load force changes to a new value, the potentiometer 92 representing viscous friction is adjusted to bring the new estimated load force value to the value recorded. The speed may have to be changed several times to refine the adjustment and obtain an accurate value of viscous friction.

Next, depending on the direction of rotation, the appropriate variable resistor 112 or 114 representing coulomb friction is adjusted until the output signal on the line 78 is zero. The motor rotation is reversed; and the other variable resistor 112 or 114 is adjusted to bring the output signal to a zero reading. Finally, an accurate value of inertia may be determined. Of all the variables, inertia is one most accurately determined by theoretical means; and therefore, this adjustment is optional. To make the adjustment, the motor speed control (not shown) is excited by a square wave input thus introducing an acceleration into the system. During the speed transitions, or the acceleration periods, the output signal on the line 78 is monitored. A spike or rapid increase and decrease of estimated load force will be observed. The potentiometer 88, representing the inverse of the inertia, is adjusted to minimize the magnitude of the spike signal. Again, in order to refine the adjustments and obtain the most accurate predetermined values possible, the above series of adjustments should be executed a number of times.

The adjustment of potentiometer 100, representing the gain in the third feedback loop, is a design problem relating to the time response and accuracy of the estimated load force relative to the actual load force. In FIG. 7, the response of the estimated force to the actual force corresponds to the response of a type zero servo system. Therefore, as those who are skilled in the art will appreciate, the larger the magnitude of the gain with respect to the magnitude of viscous friction, the nearer will be the magnitude of the estimated force signal with respect to the actual force. Further, the larger the magnitude of the gain with respect to the magnitude of inertia, the faster the response time of the estimated force in estimating the actual force.

It should be noted that the control system of transfer function 54 may be made a type one servo system by providing a capacitor feedback on the amplifier 110, thus making it an integrator. Theoretically, this system provides a more accurate estimation of load force under steady state conditions, however, such a system has a greater tendency to become unstable and oscillatory. Therefore, such a system was rejected.

It should be further noted at this point that FIGS. 1 and 2 merely represent two possible rotary actuators. The invention is applicable to other rotary actuators, e.g. an AC motor, as well as linear actuators, e.g. a piston and cylinder. In the latter case, the only changes are of a dimensional nature, in that, linear forces are produced instead of rotary forces; also masses are encountered instead of inertias in the motor and power transmission means.

While the invention has been illustrated in some detail according to the preferred embodiments shown in the accompanying drawings and while the preferred illustration embodiments have been described in some detail, there is no intention to thus limit the invention to such details. On the contrary, it is intended to cover all modifications, alterations and equivalents falling with the spirit and scope of the appended claims.

What is claimed is:

1. An apparatus for estimating a force generated by a motor as a result of an external load being imposed thereon, said estimated force being exclusive of dynamic and frictional forces in said motor, the apparatus comprising:
   a. a first transducer coupled to the motor for producing a first input signal representing a total force generated by said motor;
   b. a second transducer coupled to the motor for producing a second input signal representing a motor velocity; and
   c. a transfer function circuit having inputs responsive to the first input signal and the second input signal, said transfer function circuit including:
      1. a first circuit having a first input responsive to the first input signal and a second input and producing an output signal representing an algebraic sum of said first and second inputs,
      2. a second circuit for modifying the output signal as a function of the dynamic and frictional forces in the motor to produce a controlled output signal, and
      3. a third circuit for algebraically summing the controlled output signal with the second input signal and producing a resultant output signal, said resultant output signal being connected to the second input and produced from the transfer function circuit as a signal representing an estimate of the force generated by the motor as a result of an external load being applied thereon.

2. An apparatus for estimating a force generated by a motor as a result of an external load being imposed thereon, said estimated force being exclusive of dynamic and frictional forces in said motor, the apparatus comprising:
   a. a first transducer coupled to the motor for producing a first input signal having a magnitude representing a total force generated by said motor;
   b. a second transducer coupled to the motor output for producing a second input signal representing an output velocity of the motor;
   c. a transfer function circuit having a first input responsive to the first input signal and a second input, said transfer function circuit modifying an algebraic sum of the inputs as a function of the dynamic and friction forces in the motor and producing a controlled output signal;
   d. a summing network responsive to the second input signal and the controlled output signal for algebraically summing the second input signal with the controlled output signal and producing a first output signal; and
   e. a multiplier responsive to the first output signal and having an output connected to the second input of the transfer function circuit, said multiplier producing a feedback signal representing an estimate of the force generated by the motor as a function of a load applied thereon.

3. An apparatus for estimating a force generated by a motor as a function of an external load being applied thereon, said estimated force being exclusive of inertial and frictional forces in said motor, the apparatus comprising:
   a. a summing junction having a plurality of junction inputs and producing a junction output signal representing an algebraic sum of said inputs;
   b. a first transducer coupled to the motor and having an output connected to one of the junction inputs, said output supplying a signal representing a total force supplied by the motor;
   c. a transfer function circuit having an input responsive to the junction output signal for modifying said signal as an inverse function of the inertia of said motor and integrating the modified signal to produce a controlled output signal;
   d. a first feed back loop responsive to the controlled output signal and connected to a second junction input for modifying the controlled output signal as a function of frictional losses in the motor;
   e. a velocity transducer coupled to the motor output for producing a second input signal representing an output velocity of the motor; an
   f. a second feedback loop comprising
      1. a summing junction responsive to the controlled output signal and the second input signal for algebraically summing the controlled output signal with the second input signal and producing a velocity output signal, and
      2. A multiplier having an input responsive to the velocity output signal and an output connected to a third junction input, said amplifier producing an estimated load force signal proportional to that portion of the force generated by the motor that is a function of the external load.

4. The apparatus of claim 3 wherein the first feedback loop comprises a transfer function circuit for modifying the controlled output signal as a function of coulomb friction and viscous friction losses of the motor.

5. An apparatus for estimating a force generated by a motor as a function of an external load being imposed thereon through a power transmission, said estimated force being exclusive of inertial and frictional forces in said motor and power transmission means, the apparatus comprising:
   a. a summing junction having a plurality of junction inputs and producing a junction output signal representing an algebraic sum of said inputs;
   b. a first transducer coupled to the motor and having an output coupled to a first junction input, said output supplying a signal representing a total force supplied by the motor;
   c. a transfer function circuit responsive to the junction output signal for reducing said signal as an inverse function of the inertia of said motor and power transmission means to produce a modified signal and integrating the modified signal to produce a controlled output signal.
   d. a feedback loop responsive to the controlled output signal and connected to a second junction input for reducing the controlled output signal as a function of frictional losses in the motor and power transmission means;
   e. second transducer coupled to the motor output for producing a velocity input signal representing an output velocity of the motor;
   f. a second feedback loop comprising:
      1. a summing junction responsive to the controlled output signal and the velocity input signal for algebraically summing the controlled output signal with the velocity input signal and producing a velocity output signal, and
      2. a multiplier having an input responsive to the velocity output signal and an output connected to a third junction input, said multiplier producing an estimated force signal proportional to that portion of the force generated by the motor that is a function of the external load imposed on the motor through the power transmission means; and
   g. a potentiometer responsive to the estimated force signal and representing a mechanical advantage of the power transmission means for producing an estimated load force signal that is a function of the external load imposed on the motor.

6. The apparatus of claim 5 wherein the first feedback loop comprises a transfer function circuit for modifying the controlled output signal as a function of coulomb friction and viscous friction losses of the motor and power transmission means.

7. A method for estimating a force developed by a motor as a function of an external load applied thereon exclusive of dynamic and frictional forces in the motor, the method comprising:
   a. generating a first input signal proportional to a total force developed by said motor;
   b. algebraically summing the first input signal and a second signal and producing a first output signal;
   c. modifying the first output signal as a function of the dynamic and frictional forces within the motor and producing an attenuated output signal;
   d. integrating the attenuated output signal and producing a controlled output signal;
   e. generating a velocity signal representing an output motor velocity;
   f. algebraically summing the controlled output signal and the velocity signal to produce the second signal representing the force developed by the motor as a function of the external load applied thereon.

8. A method for estimating a force developed by a motor as a function of an external load applied thereon exclusive of dynamic and frictional forces in the motor, the method comprising:
   a. generating a first input signal proportional to a total force developed by said motor;
   b. algebraically summing the first input signal and a second signal to produce a first output signal;
   c. integrating said first output signal to produce a second output signal;
   d. modifying the second output signal in a manner inversely proportional to dynamic forces in said motor to produce a controlled output signal;
   e. reducing the controlled output signal in direct proportions to the frictional losses in the motor;
   f. generating a velocity signal representing an output motor velocity;
   g. algebraically summing the controlled output signal and the velocity signal to produce the second signal representing an estimated load force signal proportional to the force developed by the motor as a function of an external load applied thereon.

9. A method for estimating a force developed by a motor as a function of an external load applied thereon exclusive of inertial forces coulomb frictional losses and viscous frictional losses in the motor, the method comprising:
   a. generating an input signal proportional to a total force developed by said motor;
   b. producing a first signal having a magnitude inversely proportional to the inertial forces of the motor;
   c. producing a second signal having a magnitude proportional to the coulomb frictional losses of the motor;
   d. producing a third signal having a magnitude proportional to the viscous frictional losses of the motor;
   e. summing the input signal, the first signal, the second signal, the third signal and a fourth signal to produce a modified input signal;
   f. integrating the modified input signal to produce a controlled output signal;
   g. generating a velocity signal representing an output motor velocity;
   h. summing the controlled output signal with the velocity signal to produce the fourth signal, said fourth signal representing the estimated load force which is the force generated by the motor as a function of the external load applied thereon.

* * * * *